US010253905B2

(12) United States Patent
Martin (10) Patent No.: US 10,253,905 B2
(45) Date of Patent: Apr. 9, 2019

(54) WIRE MANAGEMENT CLIPS (71) Applicant: Hubbell Incorporated, Shelton, CT (US)

(72) Inventor: Evan Ronald Martin, Merrimack, NH (US)

(73) Assignee: HUBBELL INCORPORATED, Shelton, CT (US)

(*) Notice: Subject to any disclaimer, the term of this patent is extended or adjusted under 35 U.S.C. 154(b) by 0 days.

(21) Appl. No.: 15/672,936

(22) Filed: Aug. 9, 2017

(65) Prior Publication Data
US 2018/0045335 A1 Feb. 15, 2018

Related U.S. Application Data (60) Provisional application No. 62/372,342, filed on Aug. 9, 2016.

(51) Int. Cl.
| F16L 3/04 | (2006.01) |
| F16L 3/12 | (2006.01) |
| H01R 4/64 | (2006.01) |
| H02G 3/32 | (2006.01) |
| H02G 7/05 | (2006.01) |
| F24S 80/00 | (2018.01) |
| F16L 3/10 | (2006.01) |
| H02G 3/00 | (2006.01) |

(52) U.S. Cl.
CPC .............. *F16L 3/1218* (2013.01); *F16L 3/04* (2013.01); *F24S 80/00* (2018.05); *H01R 4/646* (2013.01); *H02G 3/32* (2013.01); *H02G 7/05* (2013.01); *F16L 3/1058* (2013.01); *H02G 3/263* (2013.01)

(58) Field of Classification Search
CPC ... F16L 31/1218; F16L 31/04; F16L 31/1058; H01R 4/646
See application file for complete search history.

(56) References Cited

U.S. PATENT DOCUMENTS

| 942,693 | A | | 12/1909 | Wintermute | |
| 1,332,004 | A | * | 2/1920 | Rawleigh ............. | B43K 23/001 24/336 |
| 1,398,519 | A | * | 11/1921 | Hosch .................... | A47G 25/12 24/457 |
| 2,061,463 | A | * | 11/1936 | Hall ...................... | F16B 5/0685 24/625 |
| 2,618,033 | A | | 11/1952 | Tinnerman et al. | |
| 2,712,917 | A | * | 7/1955 | Flora ..................... | F16B 5/0685 248/300 |

(Continued)

FOREIGN PATENT DOCUMENTS

CA 2824260 2/2014

OTHER PUBLICATIONS

International Search Report and Written Opinion mailed in PCT/US2017/046089 dated Oct. 27, 2017 (7 pages).

*Primary Examiner* — Anita M King
(74) *Attorney, Agent, or Firm* — Wissing Miller LLP (57) ABSTRACT A wire management clip includes a wire compartment, a first clip compartment and a second clip compartment arranged perpendicular to the first clip compartment. The wire management clip may also include a retaining member extending into the first clip compartment for contacting a surface of a structure. The wire management clip may also include a retaining member extending into the second clip compartment for contacting a surface of the structure.

23 Claims, 6 Drawing Sheets

(56) References Cited

U.S. PATENT DOCUMENTS

| | | | |
|---|---|---|---|
| 3,003,736 A * | 10/1961 | Hofgesang | A47G 29/08 248/229.26 |
| 3,020,602 A | 2/1962 | Siering | |
| 3,049,042 A | 8/1962 | De Lynn | |
| 3,131,447 A * | 5/1964 | Tinnerman | F16L 3/24 248/228.7 |
| 3,208,119 A | 9/1965 | Alexander | |
| 3,216,685 A * | 11/1965 | Alain | F16B 2/245 248/316.7 |
| 3,262,662 A * | 7/1966 | Gastaldi | H02G 3/26 248/68.1 |
| 3,528,050 A | 9/1970 | Hindenburg | |
| 3,626,553 A * | 12/1971 | Darney et al. | A63C 11/006 24/288 |
| 3,983,602 A * | 10/1976 | Barry | A42B 3/04 224/181 |
| 4,043,527 A | 8/1977 | Franzmeier | |
| 4,087,149 A | 5/1978 | Fischer | |
| 4,406,505 A | 9/1983 | Avramovich | |
| 4,875,876 A | 10/1989 | O'Loughlin | |
| 5,188,318 A * | 2/1993 | Newcomer | F16L 3/223 174/503 |
| 5,347,691 A | 9/1994 | Terazoe | |
| 5,451,167 A | 9/1995 | Zielinski | |
| 5,463,189 A | 10/1995 | Deneke et al. | |
| 5,593,327 A * | 1/1997 | Hlinsky | H01R 4/363 439/793 |
| 5,823,483 A * | 10/1998 | Gaskill | A47J 43/287 248/37.6 |
| 6,106,310 A | 8/2000 | Davis et al. | |
| 6,186,799 B1 | 2/2001 | Mello | |
| 6,234,835 B1 | 5/2001 | Bakker et al. | |
| 7,152,831 B2 * | 12/2006 | Riedy | F16L 3/221 248/68.1 |
| 7,607,618 B2 * | 10/2009 | Mori | H02G 3/32 248/51 |
| 8,025,508 B2 * | 9/2011 | Parker | H01R 4/36 439/92 |
| 8,974,245 B2 * | 3/2015 | Kovalov | H01R 27/02 439/100 |
| 9,021,667 B2 * | 5/2015 | Wasco | F16B 2/20 24/336 |
| 9,086,175 B2 * | 7/2015 | Feige | F16L 3/13 |
| D806,529 S * | 1/2018 | Olenick | D8/399 |
| 2012/0192925 A1 * | 8/2012 | Grushkowitz | F16L 3/24 136/251 |
| 2014/0061396 A1 * | 3/2014 | Magno, Jr. | H02G 3/32 248/72 |

\* cited by examiner

WIRE MANAGEMENT CLIPS

CROSS REFERENCE TO RELATED APPLICATIONS

The present application is based on and claims benefit from U.S. Provisional Application Ser. No. 62/372,342 filed Aug. 9, 2016 entitled "Wire Management Clips" the entire contents of which are incorporated herein by reference.

BACKGROUND

Field

The present disclosure relates generally to clips, and more particularly to wire management clips.

Description of the Related Art

In recent years, the use of photovoltaic arrays to provide electrical power in commercial, residential, and other environments has become popular. Photovoltaic arrays are generally composed of a number of photovoltaic modules set within a metallic frame and a rail system that supports the photovoltaic modules. The rail system is attached to a support structure such as a roof or the ground. When installing a photovoltaic array, a number of photovoltaic modules are assembled onto the rail system. The metallic frames of the individual photovoltaic modules, and the structural pieces, e.g., the rails, on which the modules mounted are generally made out of aluminum. Depending upon the size of the photovoltaic array, the rail system may include multiple metallic rails coupled or connected together in a grid-like pattern. As with other sources of electrical power, to ensure the integrity of wires running along the metal frames of the photovoltaic modules, a clip is needed in which the wire can be mounted.

SUMMARY

The present disclosure provides embodiments of wire management clips. In one exemplary embodiment, a wire management clip comprises a base member, a first clip compartment and a second clip compartment. The base member includes a wire compartment configured to receive one or more wires. The first clip compartment extends from the base member and is capable of being clipped to a structure. The second clip compartment extends from the first clip compartment and capable of being clipped to the structure.

In another exemplary embodiment, a wire management clip comprises a base member, a wire compartment, a first clip compartment and a second clip compartment. The wire compartment extends from the base member and is configured to receive one or more wires. The first clip compartment extends from the base member. The second clip compartment extends from the first clip compartment.

In another exemplary embodiment, a wire management clip comprises a wire compartment, a first clip compartment and a second clip compartment. The first clip compartment extends from the wire compartment and the second clip compartment extends from the first clip compartment and is arranged perpendicular to the first clip compartment.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Illustrative embodiments of the present disclosure may be provided as improvements to wire management clips. For example, a wire management clip may be provided with dual clip compartments allowing the clip to be arranged on a structure in various configurations.

Illustrative embodiments of the present disclosure allow a wire management clip to be arranged on a structure such that an open portion of a wire compartment can always be arranged on an "uphill" side of the structure.

Illustrative embodiments of the present disclosure include teeth that extend into at least one of the dual clip compartments for securing the clip to the structure.

In certain illustrative embodiments described herein, the wire management clip may be constructed from a suitably flexible material such as plastic, nylon, rubber, etc. Alternatively, the wire management clip may be made from a suitable metal or alloy having sufficient flexibility such as but not limited to spring steel, stainless steel, etc.

Figure 1:
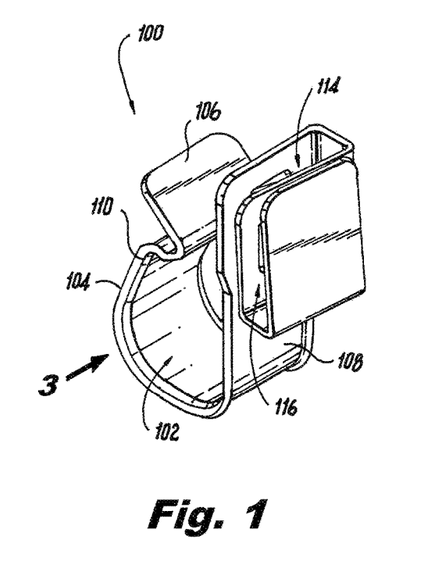
FIG. 1 is a perspective view of a wire management clip according to an illustrative embodiment of the present disclosure.
Figure 2:
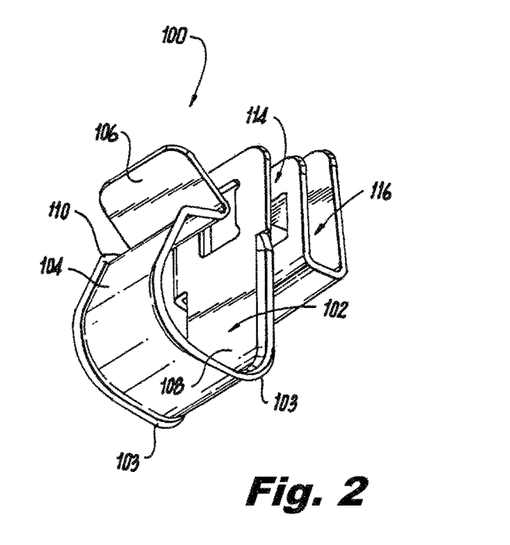
FIG. 2 is a perspective view of a wire management clip according to an illustrative embodiment of the present disclosure.
Figure 3:
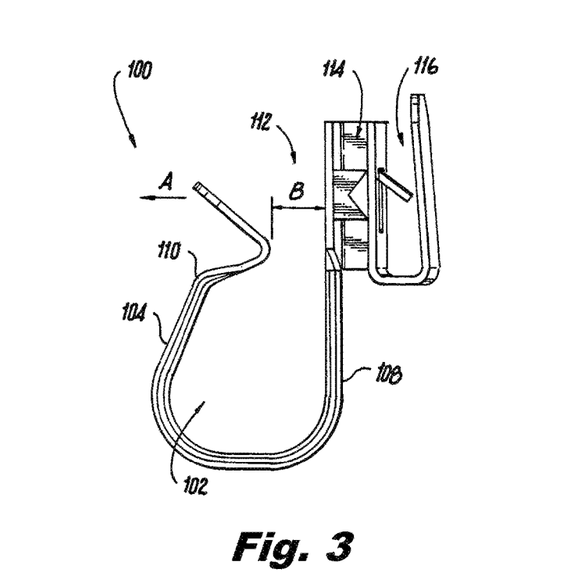
FIG. 3 is a side view of a wire management clip according to an illustrative embodiment of the present disclosure.

A wire management clip according to an embodiment of the present disclosure is shown in FIGS. 1-3 and is referred to generally as clip 100. Clip 100 includes a wire compartment 102. The wire compartment 102 is formed by a resilient arm 104 which is integral with and extends from base member 108. The shape and dimensions of resilient arm 104 are such as to provide a space or wire compartment 102 to receive and hold one or more wires (not shown). A distal end portion 110 of resilient arm 104 includes a lead-in 106, which in this exemplary embodiment is a substantially V-shaped and outwardly flaring member permitting outward flexing of resilient arm 104. However, the lead-in may be in a number of different shapes, such as a rounded edge, that facilitates easy insertion of one or more wires into the wire compartment 102. The distance B, seen in FIG. 3, between the lowest point of resilient arm 104 and base member 108 is generally slightly smaller than a diameter of a wire to be held in wire compartment 102, thereby preventing the wire from falling from the wire compartment 102. When resilient arm 104 is urged outwardly in the direction shown by arrow A in FIG. 3, a sufficient space is formed at opening 112 for allowing one or more wires to be slid into or out of the wire compartment 102. The edges 103 of resilient arm 104 and base member 108 are bent outwardly from wire compartment 102 to prevent any possibly sharp edges from coming into contact with wires mounted in wire compartment 102.

Figure 4:
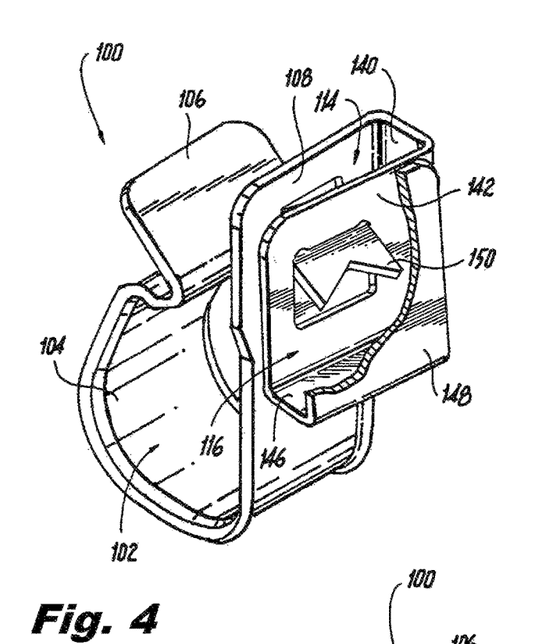
FIG. 4 is a partial cutaway perspective view of a wire management clip according to an illustrative embodiment of the present disclosure.
Figure 5:
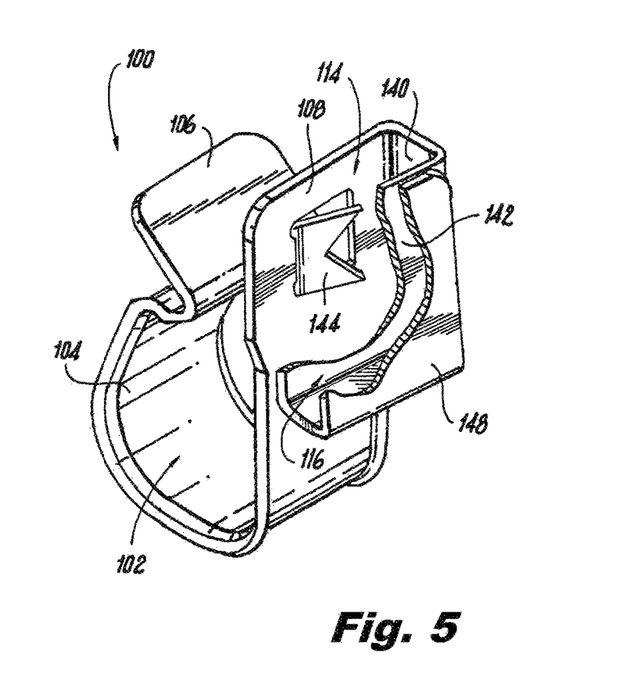
FIG. 5 is a partial cutaway perspective view of a wire management clip according to an illustrative embodiment of the present disclosure.

According to an embodiment of the present disclosure, clip 100 includes first and second clip compartments which are provided at right angles to each other allowing clip 100 to be mounted to structures in various configurations. The first clip compartment 114 is integral with and extends from base member 108. Clip compartment 114 is formed integral with base member 108 by members 140 and 142 which are bent in a substantially U-shaped configuration, seen in FIGS. 4 and 5. The clip compartment 114 includes a retaining member, such as tooth 144 having one or more pointed ends, that extends from base member 108 into clip compartment 114. In the embodiment shown in FIG. 5, the tooth 144 is a "snake fang" like tooth with two pointed ends. When clip 100 is slid onto a structure using first clip compartment 114, tooth 144 engages the surface of the structure and holds clip 100 in position. The second clip compartment 116 is integral with and extends from first clip compartment 114. Clip compartment 116 is formed integral with member 142 by members 146 and 148 which are bent in a substantially U-shaped configuration. The clip compartment 116 includes a retaining member, such as tooth 150 having one or more pointed ends, that extends from member 142 into clip compartment 116. In the embodiment shown in FIG. 4, the tooth 150 is a "snake fang" like tooth with two pointed ends. When clip 100 is slid onto a structure using second clip compartment 116, tooth 150 engages the surface of the structure and holds clip 100 in position. According to an illustrative embodiment of the present disclosure, the teeth 144, 150 are formed in situ from portions of members 108 and 142, respectively.

Figure 6:
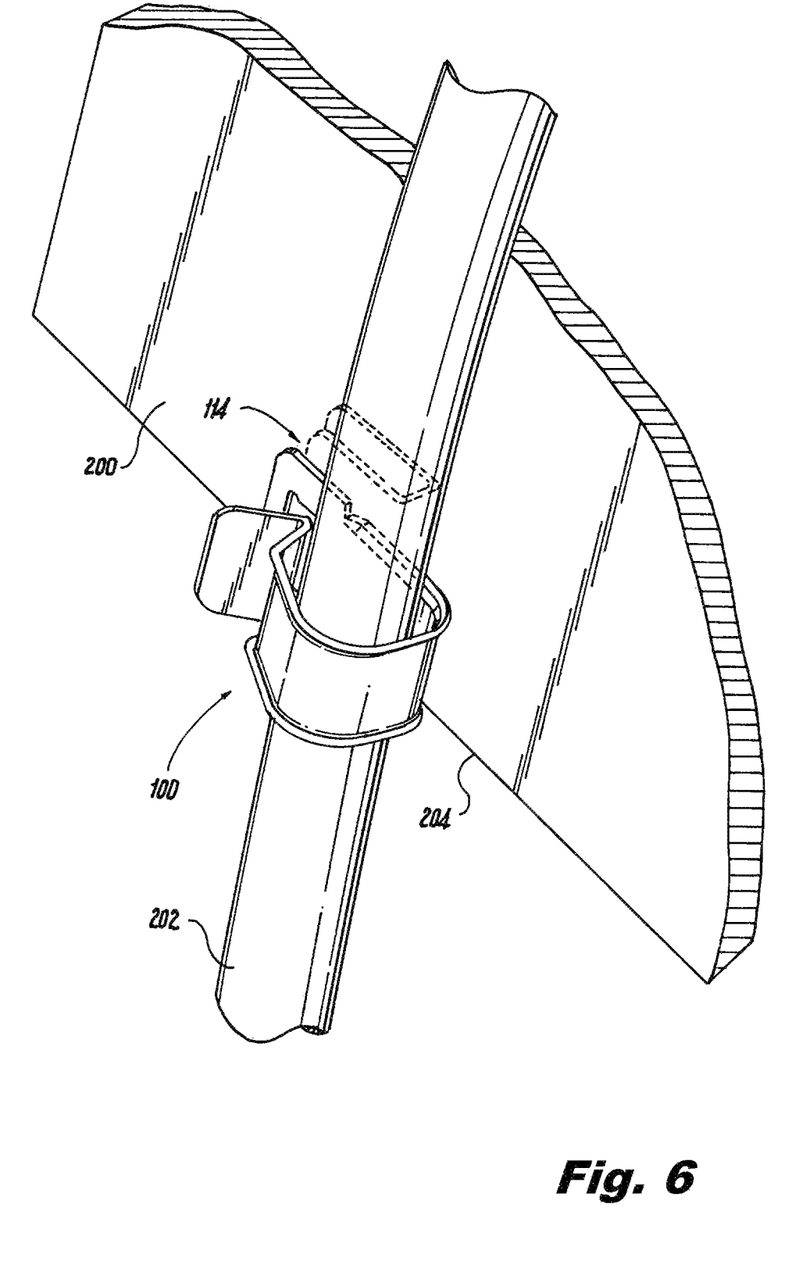
FIG. 6 is a view showing a wire management clip according to an illustrative embodiment of the present disclosure attached to a structure and holding a wire in place.
Figure 7:
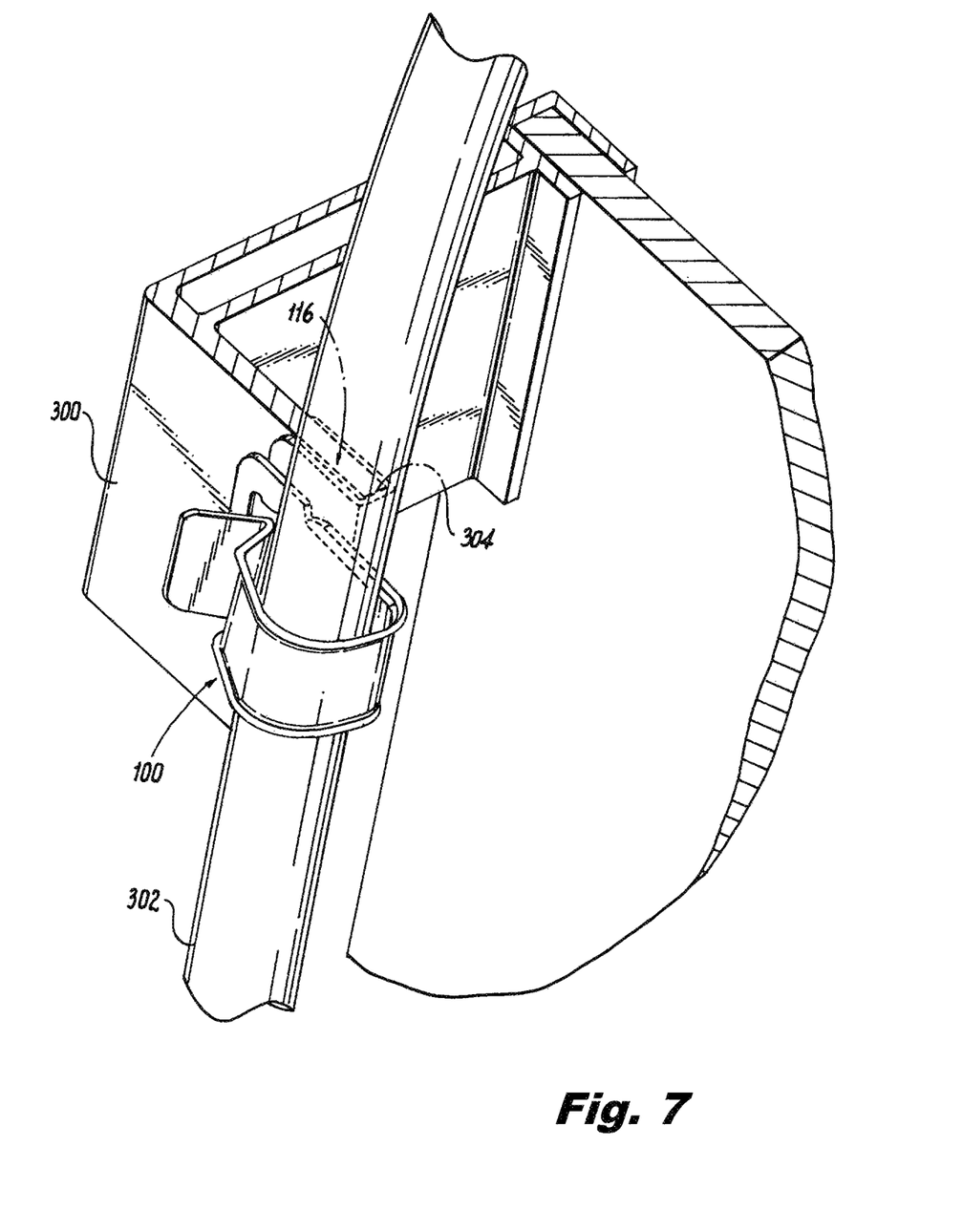
FIG. 7 is a view showing a management clip according to an illustrative embodiment of the present disclosure attached to a structure and holding a wire in place.
Figure 8:
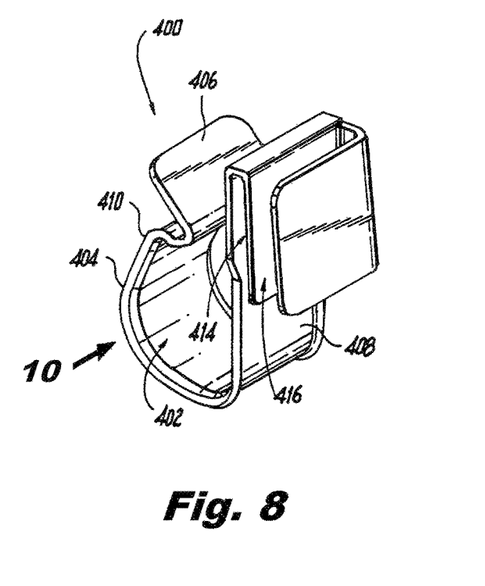
FIG. 8 is a perspective view of a wire management clip according to another illustrative embodiment of the present disclosure.
Figure 9:
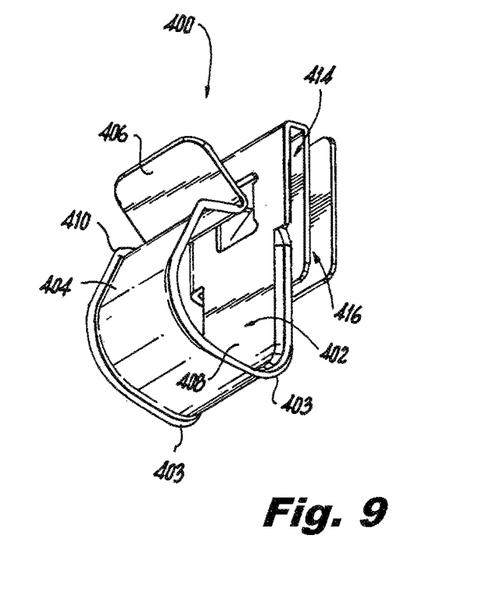
FIG. 9 is a perspective view of a wire management clip according to another illustrative embodiment of the present disclosure.
Figure 10:
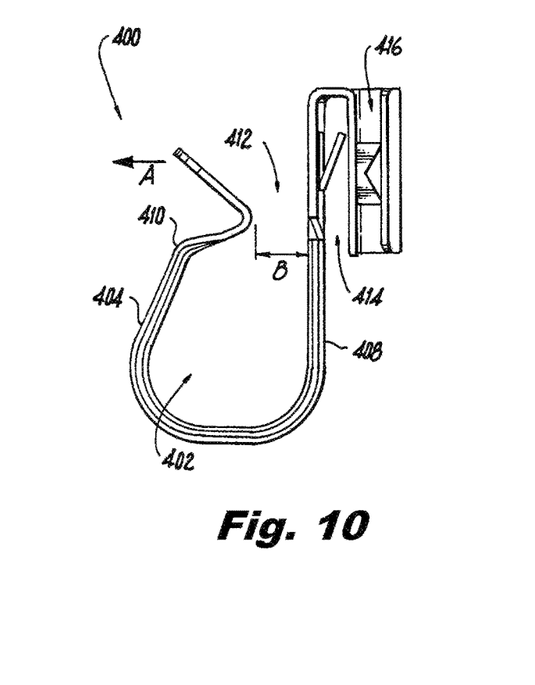
FIG. 10 is a side view of a wire management clip according to another illustrative embodiment of the present disclosure.
Figure 11:
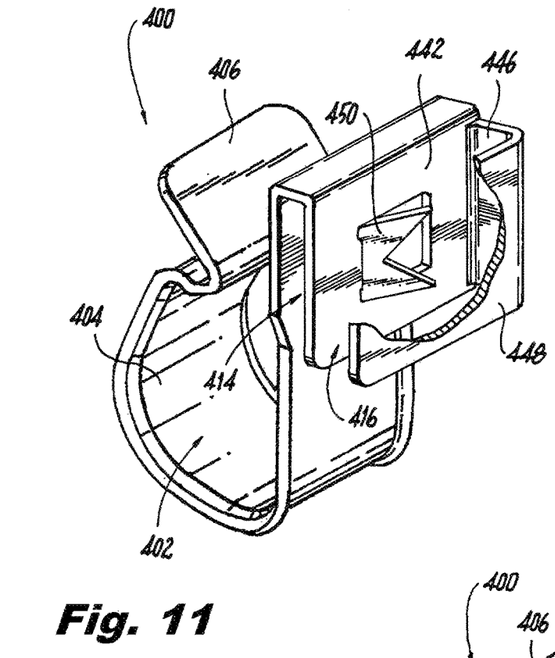
FIG. 11 is a partial cutaway perspective view of a wire management clip according to another illustrative embodiment of the present disclosure.
Figure 12:
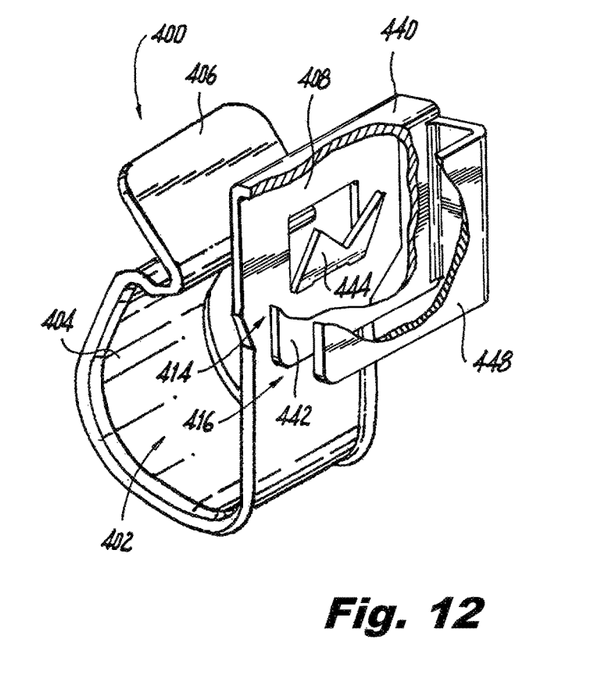
FIG. 12 is a partial cutaway perspective view of a wire management clip according to another illustrative embodiment of the present disclosure.

As shown in FIG. 6, clip 100 can be slid onto a structure 200 using first clip compartment 114. In this configuration, wire 202 can be held at a right angle to the edge 204 of structure 200. When clip 100 is slid onto a structure 300 using second clip compartment 116 as shown in FIG. 7, wire 302 can be held parallel to the edge 304 of structure 300. Utilizing the dual clip compartment feature of the present disclosure, the open side of the clip compartment can be arranged to always be on an "uphill" side of the structure further preventing any chance of the wire falling out of the clip 100.

Another embodiment of a wire management clip is shown in FIGS. 8-12 and is referred to generally as clip 400. Clip 400 is substantially similar to clip 100 described above but with the clip compartments arranged differently. Clip 400 includes a wire compartment 402. The wire compartment 402 is formed by a resilient arm 404 which is integral with and extends from base member 408. The shape and dimensions of resilient arm 404 are such as to provide a space or wire compartment 402 to accommodate one or more wires (not shown). A distal end portion 410 of resilient arm 404 includes a lead-in 406, which in this exemplary embodiment is a substantially V-shaped and outwardly flaring member permitting outward flexing of resilient arm 404. However, the lead-in 406 may be in a number of different shapes, such as a rounded edge, that facilitates easy insertion of one or more wires into the wire compartment 402. The distance B, seen in FIG. 10, between the lowest point of resilient arm 404 and base member 408 is generally slightly smaller than a diameter of a wire to be held in wire compartment 402, thereby preventing the wire from falling from the wire compartment 102. When resilient arm 404 is urged outwardly in the direction shown by arrow A in FIG. 10, a sufficient space is formed at opening 412 for allowing one or more wires to be slid into or out of the wire compartment 402. The edges 403 of resilient arm 404 and base member 408 are bent outwardly from wire compartment 402 to prevent any possibly sharp edges from coming into contact with wires mounted in the wire compartment 402.

According to this embodiment of the present disclosure, clip 400 includes first and second clip compartments which are provided at right angles to each other allowing clip 400 to be mounted to structures in various configurations. The first clip compartment 414 is integral with and extends from the distal end of base member 408. As shown most clearly in FIGS. 11 and 12, clip compartment 414 is formed integral with base member 408 by members 440 and 442 which are bent in a substantially U-shaped configuration. The clip compartment 414 includes a retaining member, such as tooth 444 having one or more pointed ends, that extends from base member 408 into clip compartment 414. In the embodiment shown in FIG. 12, the tooth 444 is a "snake fang" like tooth with two pointed ends. When clip 400 is slid onto a structure using first clip compartment 414, tooth 444 engages the surface of the structure and holds clip 400 in position. The second clip compartment 416 is integral with and extends from first clip compartment 414. Clip compartment 416 is formed integral with member 442 by members 446 and 448 which are bent in a substantially U-shaped configuration, seen in FIG. 11. The clip compartment 416 includes a retaining member, such as tooth 450 having one or more pointed ends, that extends from member 442 into clip compartment 416. In the embodiment shown in FIG. 11, the tooth 450 is a "snake fang" like tooth with two pointed ends. When clip 400 is slid onto a structure using second clip compartment 416, tooth 450 engages the surface of the structure and holds clip 400 in position. According to an illustrative embodiment of the present disclosure, the teeth 444, 450 are formed in situ from portions of members 408 and 442, respectively.

The wire management clips as described herein may be made of any material suitable for a desired application. For example, the wire management clips may be formed from any suitable type of flexible plastic, nylon, rubber, etc. Alternatively, the wire management clips may be made from a suitable metal or alloy having sufficient flexibility such as but not limited to spring steel, stainless steel, etc. When made from a suitable metal or alloy, the "snake fang" teeth may penetrate the surface of the structure to which the wire management clip is attached providing electrical continuity to the structure.

It will be appreciated that the description herein may refer to first, second, right, left, etc. for ease of description purposes only and does not in any way relate to the wire management clip in actual use. The term "wire" is used herein in the general manner and refers to any type and size of conductor. The wire may be solid single stranded or may consist of two or more strands. The wire may be insulated or non-insulated.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A wire management clip comprising:
   a base member including a wire compartment;
   a first clip compartment integrally formed into the base member and including a first opening for clipping the first clip compartment to a structure; and
   a second clip compartment integrally formed into the first clip compartment and including a second opening for clipping the second clip compartment to the structure, wherein the second opening is at an angle relative to the first opening.

2. The wire management clip as recited in claim 1, further comprising a retaining member extending into the first clip compartment for contacting a surface of the structure.

3. The wire management clip as recited in claim 2, wherein the retaining member extending into the first clip compartment comprises a tooth.

4. The wire management clip as recited in claim 1, further comprising a retaining member extending into the second clip compartment for contacting a surface of the structure.

5. The wire management clip as recited in claim 4, wherein the retaining member extending into the second clip compartment comprises a tooth.

6. The wire management clip as recited in claim 1, further comprising at least one retaining member extending into at least one of the first clip compartment and the second clip compartment for contacting a surface of the structure.

7. The wire management clip as recited in claim 1, wherein the wire compartment comprises a resilient arm which is integral with and extends from the base member.

8. The wire management clip as recited in claim 7, wherein a shape and dimension of the resilient arm are such as to accommodate at least one wire.

9. The wire management clip as recited in claim 8, wherein a distal end portion of the resilient arm includes a lead-in permitting outward flexing of the resilient arm.

10. A wire management clip comprising:
    a wire compartment including a base member;
    a first clip compartment including:
       at least a portion of the base member;
       a first member extending from the base member; and
       a second member extending from the first member such that the second member is substantially parallel to the base member and a first opening is formed between the base member and the second member for clipping the first clip compartment to a structure; and
    a second clip compartment including:
       the second member;
       a third member extending from the second member; and
       a fourth member extending from the third member such that the fourth member is substantially parallel to the second member and a second opening is formed between the second member and the fourth member for clipping the second clip compartment to the structure, wherein the second opening is at an angle relative to the first opening.

11. The wire management clip as recited in claim 10, wherein the first member extends from a side edge of the base member and the second member extends from an end of the first member, and wherein the third member extends from a side of the second member and the fourth member extends from an end of the third member.

12. The wire management clip as recited in claim 10, wherein the first member extends from an end of the base member and the second member extends an end of the first member, and wherein the third member extends from a side of the second member and the fourth member extends from an end of the third member.

13. A wire management clip comprising:
    a wire compartment including a base member;
    a first clip compartment including:
       at least a portion of the base member;
       a first member extending from a side of the base member; and
       a second member extending from an end of the first member such that the second member is substantially parallel to the base member and a first opening is formed between the base member and the second member for clipping the first clip compartment to a structure; and
    a second clip compartment including:
       the second member;
       a third member extending from a side of the second member; and
       a fourth member extending from an end of the third member such that the fourth member is substantially parallel to the second member and a second opening is formed between the second member and the fourth member for clipping the second clip compartment to the structure, wherein the second opening is substantially orthogonal to the first opening.

14. The wire management clip as recited in claim 13, further comprising a retaining member extending into the first clip compartment for contacting a surface of a structure.

15. The wire management clip as recited in claim 14, wherein the retaining member extending into the first clip compartment comprises a tooth.

16. The wire management clip as recited in claim 13, further comprising a retaining member extending into the second clip compartment for contacting a surface of the structure.

17. The wire management clip as recited in claim 16, wherein the retaining member extending into the second clip compartment comprises a tooth.

18. The wire management clip as recited in claim 13, further comprising at least one retaining member extending into at least one of the first clip compartment and the second clip compartment for contacting a surface of a structure.

19. The wire management clip as recited in claim 13, wherein the wire compartment comprises a resilient arm which is integral with and extends from a base member.

20. The wire management clip as recited in claim 19, wherein a shape and dimension of the resilient arm are such as to accommodate at least one wire.

21. The wire management clip as recited in claim 19, wherein a distal end portion of the resilient arm includes a lead-in permitting outward flexing of the resilient arm.

22. The wire management clip as recited in claim 1, wherein the angle is substantially 90 degrees.

23. The wire management clip as recited in claim 10, wherein the angle is substantially 90 degrees.

\* \* \* \* \*